United States Patent
Coderre

(10) Patent No.: US 6,298,567 B1
(45) Date of Patent: Oct. 9, 2001

(54) TRAM BAR IN A MILLING MACHINE OR THE LIKE

(76) Inventor: Marcel W. Coderre, 137 Trout Stream Dr., Vernon, CT (US) 06066

( * ) Notice: Subject to any disclaimer, the term of this patent is extended or adjusted under 35 U.S.C. 154(b) by 0 days.

(21) Appl. No.: 09/447,648

(22) Filed: Nov. 23, 1999

Related U.S. Application Data

(63) Continuation-in-part of application No. 08/877,233, filed on Jun. 17, 1997, now abandoned.

(51) Int. Cl.$^7$ ....................................................... G01B 5/00
(52) U.S. Cl. ................................. 33/501; 33/642; 33/348; 248/904; 248/298.1
(58) Field of Search ............................... 33/501, 533, 551, 33/613, 626, 636, 638, 639, 641, 642, 645, 832, 628, 634, 549, 348, 201, 572, 573, 559, 556; 248/904, 298.1, 231.61, 316.6

(56) References Cited

U.S. PATENT DOCUMENTS

| | | | |
|---|---|---|---|
| 1,953,614 | * 4/1934 | King | 33/642 |
| 2,456,003 | * 12/1948 | Knutson | 33/543 |
| 2,625,746 | * 1/1953 | Rudhart | 33/642 |
| 2,721,390 | * 10/1955 | Pasturczak | 33/642 |
| 3,180,030 | * 4/1965 | Witzke | 33/556 |
| 3,214,839 | * 11/1965 | Cunningham | 33/533 |
| 4,896,857 | * 1/1990 | McCullough | 248/904 |
| 5,036,595 | * 8/1991 | Nevery | 248/904 |

* cited by examiner

Primary Examiner—Andrew H. Hirshfeld
(74) Attorney, Agent, or Firm—McCormick, Paulding & Huber LLP

(57) ABSTRACT

The milling machine tool holder or chuck is used to support a spindle on a chuck axis through which a crossbar is transversely and slideably mounted. First and second ends of the crossbar adjustably support a mirror and a dial indicator, respectively, so a machine operator can see a dial face of the dial indicator that is not visible and facing away from the operator. The crossbar has a bend which enables the dial indicator to be articulated to conveniently measure features near the chuck axis without interference between the spindle and the dial indicator. The dial indicator is securely mounted to a clamp adapter which is mounted to the second end. A wedge-shaped slot in the adapter is configured to receive and secure one of a plurality of sizes of dial indicators.

13 Claims, 3 Drawing Sheets

TRAM BAR IN A MILLING MACHINE OR THE LIKE

CROSS REFERENCE TO RELATED APPLICATION

This application is related to an application filed on Jun. 17, 1997, Ser. No. 08/877,233, now abandoned, and priority to that application is claimed in this Continuation-in-Part application.

FIELD OF THE INVENTION

This invention relates generally to tram bars and, more particularly, to a tram bar and a comparator used in the environment of a metal-cutting machine, such as a milling machine. In such a machine, a work piece is supported on a moveable table and a tool or cutter is rotatably supported in a collet or chuck. In accordance with the present invention, an improved tram bar is mounted in place of the cutting tool and allows a machine operator to inspect the workpiece with a minimum of time and effort.

BACKGROUND OF THE INVENTION

While operating on a workpiece using a conventional metal-cutting machine, such as a milling machine, where the workpiece is clamped to a work table, a dial indicator is periodically mounted in the chuck to gage its various surfaces. The operator must then maneuver the work table to move the workpiece into various desired positions with respect to his work station and to the milling machine axis. The quality or accuracy of the finished product depends on the accuracy with which the dial indicator is used to position the workpiece with respect to the machine axis.

The desired position of the workpiece is first approximated by the operator without the aid of any inspection device. A dial indicator is then inserted into the chuck and used according to known procedures to precisely adjust the location of the workpiece. An existing feature of the workpiece, such as a pilot hole, a slot or workpiece face, is typically used as a reference when positioning the workpiece. For instance, a workpiece may be centered on the machine axis using a dial indicator to compare sides of an existing hole to one another and the machine axis. The dial indicator may be mounted to a crossbar or one leg of an L-shaped bar to provide a convenient way of swinging the indicator through 360 degrees to compare different faces of the workpiece to one another at various radial distances from the machine axis. Prior art procedures, however, are cumbersome and time-consuming, regardless of whether the machine is a standard, manually-operated milling machine, or an automatic machine, such as a computer numeric control (CNC) machine.

The operator uses one hand to turn the machine tool chuck and the indicator mounted therein. The other hand is used to control movement of the machine table. With practice, both hands can be manipulated simultaneously to position the work table and rotate the chuck. However, during this procedure, when the dial indicator is rotated so that its dial face cannot be seen by the operator, the dial indicator cannot simply be rotated for viewing by the operator. The dial indicator must remain undisturbed in relation to the machining axis while measuring a workpiece. Instead, the operator will generally relinquish control of the work table and use one hand to manipulate a hand-held mirror so he can view the dial face while the other hand rotates the chuck.

When the dial indicator is mounted to a crossbar, which allows large workpieces to be measured, the dial indicator may physically interfere with the chuck when the indicator is positioned near the machine axis. This occurs when a feature such as a small hole is being measured and the indicator must be tilted in order to reach the feature near the axis. To avoid interference, the indicator is typically moved outwardly along the crossbar and tilted even further toward the machine axis so the small hole can be measured. By tilting the indicator, however, the dial face is left at an obscure angle and is for the operator difficult to view.

A clamp adapter is generally required to fasten the dial indicator to the tram bar. Prior art clamp adapters, however, are typically configured to receive only one size of dial indicator mount shaft, so each dial indicator must have its own clamp adapter. This results in increased cost to the operator, and increased time spent changing adapters.

A tram bar is needed which facilitates the use of various sizes of dial indicators, and reduces the number of manual tasks which the operator must perform while aligning and measuring a workpiece on a metal-forming machine. The present invention is drawn toward such an inspection device.

SUMMARY OF THE INVENTION

One object of the present invention is to provide a tram bar that can effectively and easily measure features of a workpiece at any radial distance from, or angular relationship to, the machining axis within its reach.

Another object of the present invention is to provide a tram bar which can secure various sizes of indicator mount shafts.

Yet another object of the present invention is to eliminate the need for a hand-held mirror to view a dial indicator face resting in certain orientations.

In accordance with the present invention, a tram bar is provided in a metal-cutting machine, such as a milling machine, where a workpiece is supported on a work table, and wherein a cutting tool is normally provided on a machine axis in a rotatable support above the work table. In place of the cutting tool, the present invention contemplates inserting a spindle into the collet or chuck and providing a crossbar on the spindle so that the crossbar can be adjusted transversely of the machine axis. The crossbar has one end which is bent at an angle and provided with a clamp adapter. A dial indicator is adjustably secured to the clamp adapter so that the dial indicator can be articulated to rest in a plane generally parallel to the machine axis. A second end of the crossbar mounts a reflective mirror so that the dial indicator can be read when facing away from the operator.

One feature of the tram bar is the bent crossbar which allows the dial indicator to be articulated to an easily-viewed position when measuring a workpiece feature near the machine axis.

Another feature of the tram bar is a wedge-shaped receiving bore of the clamp adapter which mounts various sizes of indicator mount shafts.

An advantage of the present invention is that the tram bar can be used to easily measure a workpiece feature when the dial indicator faces away from the operator.

These and other objects, features and advantages of the present invention will become more apparent in the light of the following detailed description of best mode embodiments thereof as illustrated in the accompanying drawings.

DETAILED DESCRIPTION OF THE PREFERRED EMBODIMENT

Figure 1:
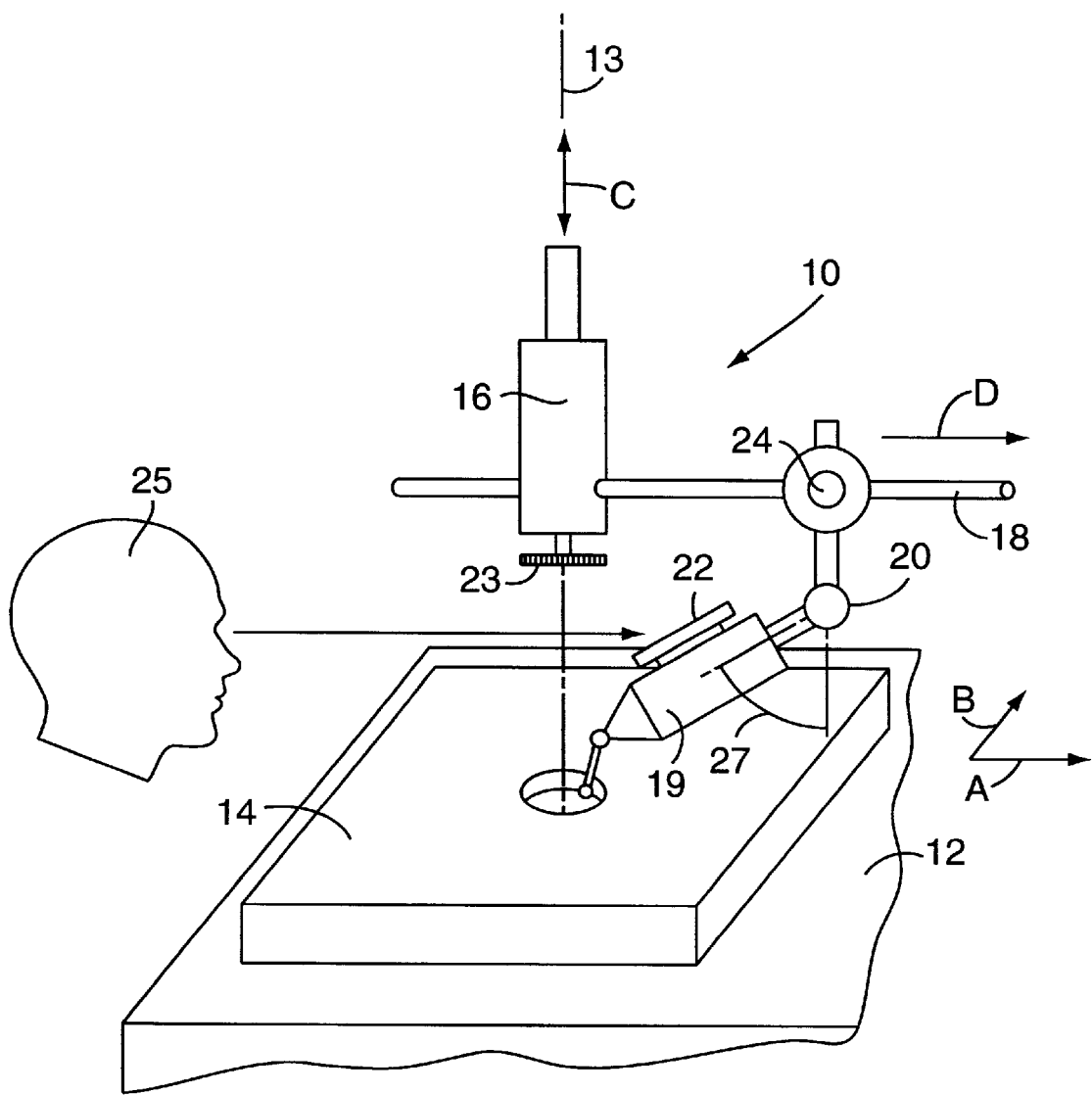
FIG. 1 is a perspective view of a prior art tram bar shown schematically with a straight crossbar securing an indicator gage.

Turning now to a more detailed description of FIG. 1, the current state of the art in tram bars is illustrated as used on an end mill (not shown) and indicated generally by the numeral 10. The mill has a work table 12 which can be moved in the direction of the arrows A and B as a cutting tool (not shown) is rotatably supported in the milling machine and moved vertically along machine axis 13 into contact with a workpiece 14 in the direction of arrow C, to form the workpiece 14 in accordance with known techniques. The cutting tool is removed, and in its place in the collet or chuck of the end mill, a spindle 16 is provided as shown.

The tram bar 10 includes a straight crossbar 18 mounted to the spindle 16, and an indicator 19 having a single pivot 20, a dial face 22 and a lock screw 23. The lock screw 23 secures the crossbar 18 to the spindle 16. Tram bar 10 is difficult to use when a feature of the workpiece 14 is being measured near the machine axis 13, because the spindle 16 often interferes with the indicator 19 when the indicator is tilted to measure the feature. To avoid interference, the indicator 19 must be moved along the crossbar 18 in the direction of arrow D. However, when the indicator 18 is so moved, it must be angled such as indicated by the numeral 27, leaving the dial face 22 in a difficult viewing position for operator 25.

Another problem with tram bar 10 occurs when the spindle 16 is rotated to a position such that the indicator 19 is closer to the operator 25 than the machine axis 13. In other words, in this position, the dial face 22 is facing predominantly away from, and not visible to, the operator 25. To view the dial face 22, the operator must use a hand held mirror or physically move himself to a position that affords a better view of the dial face 22, resulting in wasted time and effort.

Figure 2:
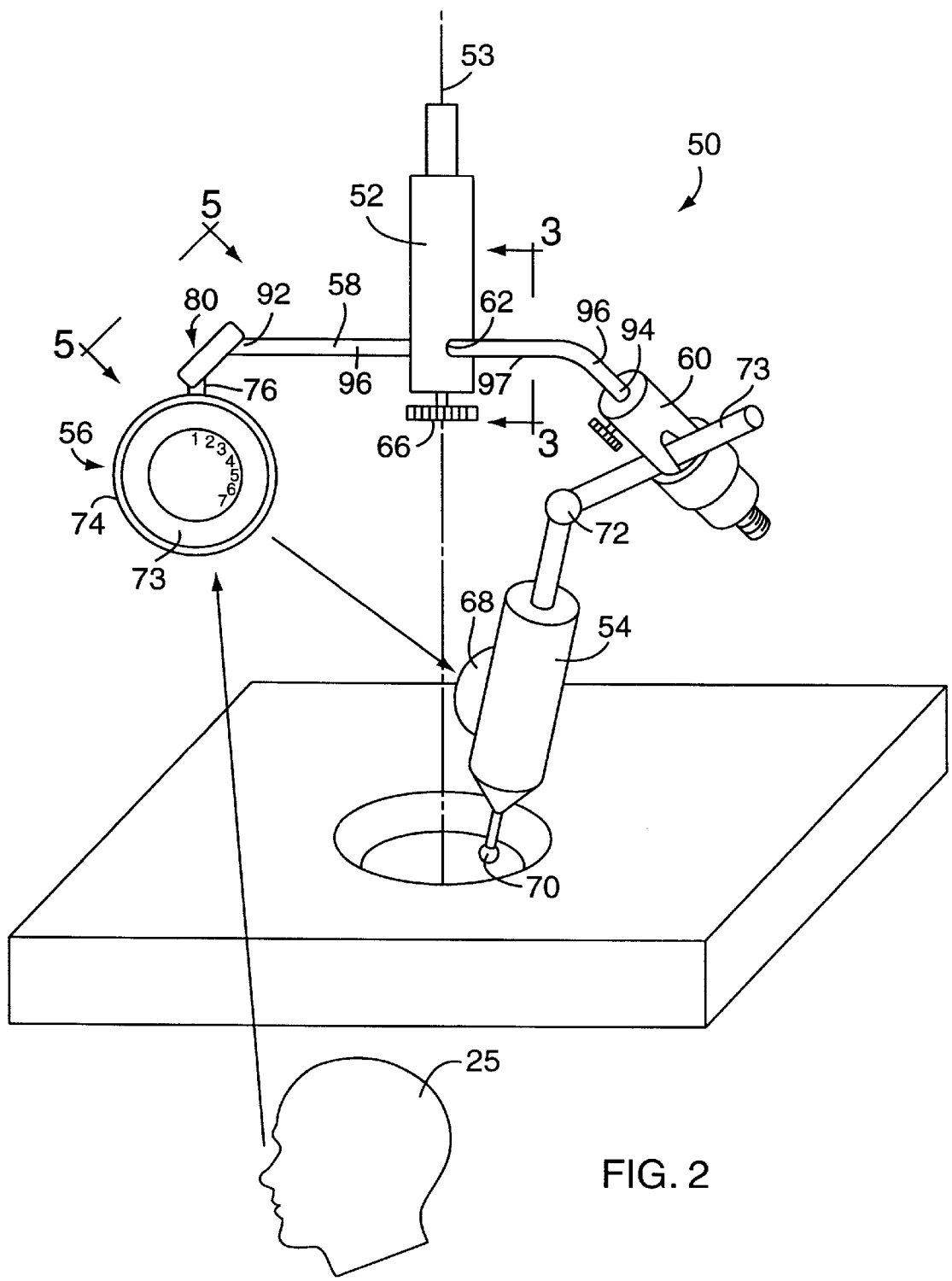
FIG. 2 is a perspective view of a tram bar according to the present invention showing a crossbar mounted to a spindle and securing a clamp adapter and a mirror.

Referring to FIG. 2, a tram bar 50 according to the present invention includes a spindle 52, an indicator gage 54, a mirror 56, a steel crossbar 58, and a clamp adapter 60. The spindle 52 has a spindle axis 53 and is configured to be received within a chuck (not shown) of a milling machine or other metal-cutting machine. The spindle 52 defines a cylindrical crossbar receiving bore 62 for mounting the crossbar 58 transversely to the spindle axis 53. A knurled thumb screw 66 is threaded into the spindle 52 for engaging, and tightening against, the crossbar 58.

The indicator gage 54 is well know in the art and includes a dial face 68, an indicator tip 70, and a single pivot 72 for articulating the indicator gage 54. The indicator gage 54 has a mount shaft 73 which is secured to the adapter 60 in a manner which is described in detail below.

The mirror 56 has a reflective surface 75 and a polymeric mirror back 74 which is provided with, and secures, a supporting post 76. The post 76 is preferably steel and is set in a mold as the back 74 is being injection molded. The post 76 is received in a clamping device 80 that frictionally holds the mirror 56 to the crossbar 58 in a desired angular relationship to both the spindle axis 53 and the crossbar 58. The clamping device 80 allows manual adjustment of the mirror 56 (one time only) to allow the observer to view the dial face 68 by looking into the reflective surface 75.

Figure 3:
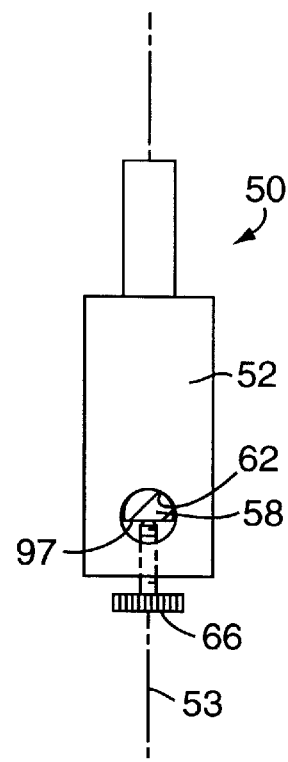
FIG. 3 is an enlarged cross sectional view of the spindle and crossbar of FIG. 2 taken along the lines 3—3.

The crossbar 58 includes first and second ends 92, 94, a straight first portion 96, a second portion 98 that is angled or bent with respect to the first portion 96, and a flat 97. The flat 97, which is better seen in FIG. 3 extends along the length of the crossbar, and has a width that allows effective engagement of the crossbar thumb screw 66 with the crossbar 58. The flat 97 forms a plane which is perpendicular to a plane that includes the first and second portions of the crossbar 58.

In use, the crossbar 58 is movable along the first portion 96, and is secured to the spindle 52 by tightening the thumb screw 66 against the flat 97 of the crossbar 58. It is contemplated that while the tram bar 50 will be used primarily by tightening the thumb screw 66 against the flat 97, it is apparent that the crossbar 58 can be rotated and secured within the bore 62 in a different orientation. The alternative use allows articulation of the dial indicator to orientations which are not possible when the thumb screw 66 is tightened against the flat 97.

Figure 4:
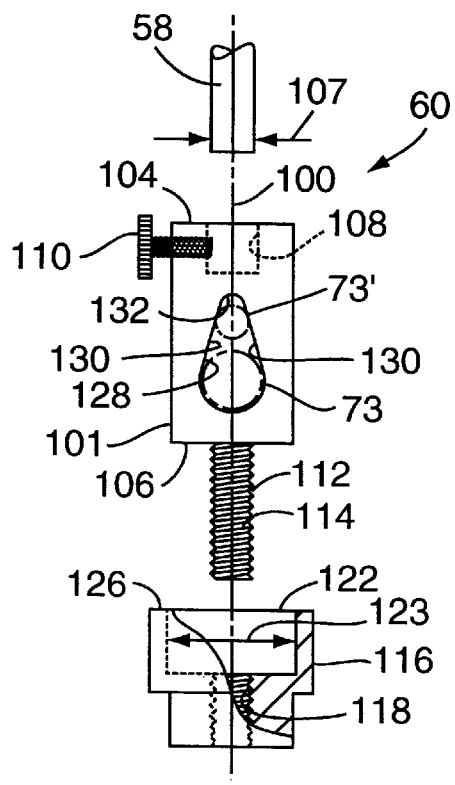
FIG. 4 is an enlarged elelvational view of the adapter illustrated in FIG. 2 shown with the crossbar and a clamp adapter cap disassembled.

Referring to FIG. 4, the clamp adapter 60 has an adapter axis 100 and includes a cylindrical outer surface 101 extending between proximate and distal ends 104, 106. A cylindrical mount bore 108 is defined in the proximate end 104 and is slightly larger in diameter than a diameter 107 of the crossbar 58. When the crossbar 58 is inserted into the mount bore 108, a thumb screw 110 is used to secure the adapter 60 to the crossbar 58.

The clamp adapter 60 has a threaded stud 112 extending distally from the distal end 106 along the adapter axis 100, and includes threads 114. An adapter cap 116 is configured to be installed over the stud 112 and includes a threaded bore 118 and a hollow end 122. The threads 114 of stud 112 cooperate with threads of the threaded bore 118. The hollow end 122 has an inner diameter 123 that is slightly larger than the outer diameter of the adapter 60, and a flat surface 126 that engages and tightens against the shaft 73 when the cap 116 is threaded over the stud 112.

A wedge-shaped slot 128 is defined transversely through the adapter axis 100 of the adapter 60, and is configured to receive a plurality of differently sized indicator mount shafts 73. By configuring the slot 128 to receive mount shafts having 5/32", 3–16 , and ¼" diameters, the adapter can be used with the most common dial indicator sizes. The slot 128 has walls 130 and a small slot end 132, shaped generally in the form of a wedge. When the shaft 73 is inserted through the slot 128 and the adapter cap 116 threaded into the stud 112, the flat surface 126 of the cap 116 forces the shaft 73 into the wedge, or slot end 132. As illustrated, an indicator mount shaft 73' having a small diameter is wedged further toward the small slot end 132 than an indicator mount shaft 73 with a large diameter. In either case, the indicator mount shaft is snugly secured in the adapter 60 between the flat surface 126 of the adapter cap 116 and walls 130 of the adapter 60.

Figure 5:
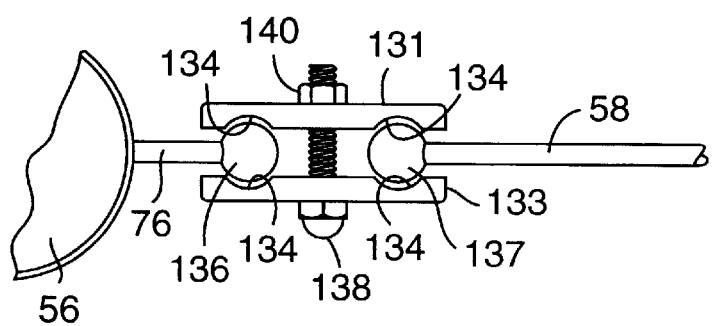
FIG. 5 is an enlarged elevational view of a clamping device taken along the lines 5—5 of FIG. 2.

Referring to FIG. 5, the clamping device 80 secures the post 76 of the mirror 56 to the crossbar 58, and includes opposed plates 131, 133. Each of the plates 131, 133 has relieved areas 134 for contacting a spherically-shaped end 136 of the support post 76, and a steel ball 137 at the end of the crossbar 58. A conventional fastener such as a screw and nut 138, 140 are used to secure the opposed plates 131, 133 against the ball 137 and end 136.

Obviously, if the dial face 68 in FIG. 2 is facing the operator, it can be viewed without use of the mirror 56, but one important feature of the present invention resides in the fact that the operator 25 can use the mirror 56 to read the dial face 68 while using both hands to manipulate the work table and the machine chuck, even when the dial face 68 is facing away from the operator.

Variation to the above-described embodiment of my invention will occur to those skilled in the art. Although a vertical milling machine is shown, the invention can be adapted for use in a horizontal milling machine, and in other machines where a rotatable cutter is moved relative to a work piece to form a machined surface. Additionally, variations can be made to the adapter cap to enable a more secure attachment of the crossbar to the adapter, including fitting the flat surface 126 of the cap 116 with a pliable or resilient material to provide a locking effect for the adapter cap against the shaft 73. Alternatively, the flat surface 126 can be treated or machined to improve its frictional engagement with the shaft 73. Further, the adapter can be configured to receive additional configurations of dial indicators by changing the configuration of the wedge-shaped slot 128 accordingly. Still even further, the adapter cap can be attached to the adapter using methods other than threads, such as a quick release-type of locking lever or retainer.

I claim:

1. A tram bar for gaging a workpiece in a metal-cutting machine having a machine axis, comprising:
   a spindle having an axis for mounting coaxially with said machine axis;
   a crossbar having a first crossbar end and a second crossbar end, said crossbar oriented transversely to said spindle axis;
   a clamp adapter provided on said second crossbar end and defining a wedge-shaped orifice extending transversely through said clamp adapter for receiving an indicator tool;
   a cap threadably mounted on said clamp adapter and configured to clamp said indicator tool within a space defined in part by said cap and in part by said wedge-shaped orifice; and
   a reflective mirror provided on said first crossbar end, and a frictional support for said mirror so as to allow adjustments to be made in the orientation of the mirror thereby affording a view in said mirror of said indicator tool by an operator at a front area of the metal-cutting machine.

2. The tram bar of claim 1, wherein said crossbar further comprises first and second longitudinal portions, said first longitudinal portion extending linearly from said first crossbar end to a bend along a first longitudinal axis, said second longitudinal portion extending linearly from said bend to said second crossbar end at an angle with respect to said first longitudinal portion along a second longitudinal axis, said crossbar being slideably and transversely mounted to said spindle from said first longitudinal portion.

3. The tram bar of claim 2, wherein said crossbar further comprises a flat section defined along said first and second longitudinal axes and perpendicular to a plane which includes said first and second portions.

4. The tram bar of claim 3, wherein said clamp adapter is adapted for adjustably securing said indicator tool in said plane.

5. The tram bar of claim 1, wherein said frictional support for said mirror includes at least one link pivotably connecting said mirror to said first crossbar end.

6. The tram bar of claim 5, wherein said frictional support includes pivotal connections at each end of said link.

7. A tram bar for gaging a workpiece in a metal-cutting machine having a machine axis, comprising:
   a spindle having an axis for mounting coaxially with said machine axis;
   a crossbar having a first crossbar end and a second crossbar end, said crossbar oriented transversely to said spindle axis;
   a clamp adapter provided on said second crossbar end and defining a wedge-shaped orifice extending transversely through said adapter;
   an indicator tool received in said wedge-shaped orifice;
   a cap threadably mounted on said clamp adapter and configured to clamp said indicator tool within a space defined in part by said cap and in part by said wedge-shaped orifice; and
   a reflective mirror provided at said first crossbar end, and a frictional support for said mirror so as to allow adjustments to be made in the orientation of the mirror thereby affording a view in said mirror of said indicator tool by an operator at a front area of the metal-cutting machine.

8. The tram bar of claim 7, wherein said crossbar further comprises first and second longitudinal portions, said first longitudinal portion extending linearly from said first crossbar end to a bend along a first longitudinal axis, said second longitudinal portion extending linearly from said bend to said second crossbar end at an angle with respect to said first longitudinal portion along a second longitudinal axis, said crossbar being slideably and transversely mounted to said spindle from said first longitudinal portion.

9. The tram bar of claim 8, wherein said crossbar further comprises a flat section defined along said first and second longitudinal axes and perpendicular to a plane which includes said first and second portions.

10. The tram bar of claim 9, wherein said clamp adapter is adapted for adjustably securing said indicator tool in said plane.

11. The tram bar of claim 7, wherein said frictional support for said mirror includes at least one link pivotably connecting said mirror to said first crossbar end.

12. The tram bar of claim 11, wherein said frictional support includes pivotal connections at each end of said link.

13. The tram bar of claim 7, wherein said indicator tool is an indicator gage with a dial face maneuverable to a plane substantially parallel to said machine axis.

* * * * *